US007533201B2

(12) United States Patent (10) Patent No.: US 7,533,201 B2
Chew (45) Date of Patent: May 12, 2009

(54) QUEUE MANAGEMENT MECHANISM IN NETWORK PROCESSOR WHEREIN PACKETS STORED AT MEMORY DEVICE CORRESPONDS TO ADDRESSES STORED IN PLURITY OF QUEUES WITHIN QUEUE MANAGEMENT

(75) Inventor: Yen Hsiang Chew, Penang (MY)

(73) Assignee: Intel Corporation, Santa Clara, CA (US)

( * ) Notice: Subject to any disclaimer, the term of this patent is extended or adjusted under 35 U.S.C. 154(b) by 177 days.

(21) Appl. No.: 11/645,366

(22) Filed: Dec. 26, 2006

(65) Prior Publication Data

US 2008/0155139 A1 Jun. 26, 2008

(51) Int. Cl.
*G06F 13/14* (2006.01)
(52) U.S. Cl. ............................ 710/56; 710/48; 710/260; 710/261; 710/268; 710/52
(58) Field of Classification Search .................... 710/48, 710/56, 260, 261, 268, 52
See application file for complete search history.

(56) References Cited

U.S. PATENT DOCUMENTS 7,366,814 B2* 4/2008 Shimizu et al. ............. 710/268

\* cited by examiner

*Primary Examiner*—Tammara Peyton
(74) *Attorney, Agent, or Firm*—Blakely, Sokoloff, Taylor & Zafman LLP

(57) ABSTRACT

According to one embodiment, a method is disclosed. The method includes selecting a first of a plurality of programmable interrupt enable registers, a controller determining for the first register whether there interrupts at a queue manager to be processed by a processor, the processor reading an interrupt status register within the queue manager, the processor processing packets corresponding to addresses stored in each of a plurality of queues within the queue manager, selecting a second of a plurality of programmable interrupt enable registers and the controller determining for the second register whether there interrupts at the queue manager to be processed by the processor.

22 Claims, 4 Drawing Sheets

QUEUE MANAGEMENT MECHANISM IN NETWORK PROCESSOR WHEREIN PACKETS STORED AT MEMORY DEVICE CORRESPONDS TO ADDRESSES STORED IN PLURITY OF QUEUES WITHIN QUEUE MANAGEMENT

FIELD OF THE INVENTION

The present invention relates to networking; more particularly, the present invention relates to network processors.

BACKGROUND

Communication (or Network) processors are designed for efficient implementation of switching and routing functions for digital networks, such as the Internet. Particularly, network processors control the flow of packets between a physical transmission medium. To control traffic in a network, a Quality of Service (QoS) control mechanism is implemented. QoS provides different priority to different users or data flows, or guarantee a certain level of performance to a data flow in accordance with requests from an application program. QoS guarantees are important if network capacity is limited, especially for real-time streaming multimedia applications.

Currently, quality of service for Internet traffic is implemented using a queue manager interrupt service request arbiter, or by software. The queue manager service request arbiter partitions interrupts from queues into smaller groups and connects each group to a different set of arbiters that form a first layer of arbitration.

Another set of arbiters combine the outputs of the first layer arbiters to form the next layer of arbitration. This process of cascading the outputs of the previous layer of arbitration to form next layer is utilized to provide QoS for Internet traffic from different queues. This method is non-configurable because priorities are often pre-set and pre-mapped to dedicated queues in each unique communication processor design. Implementing a software solution on the other hand may add substantial overhead to the communication processor, and significantly decrease processor efficiency.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A configurable queue management mechanism for Internet packet traffic QoS in a network processor is disclosed. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
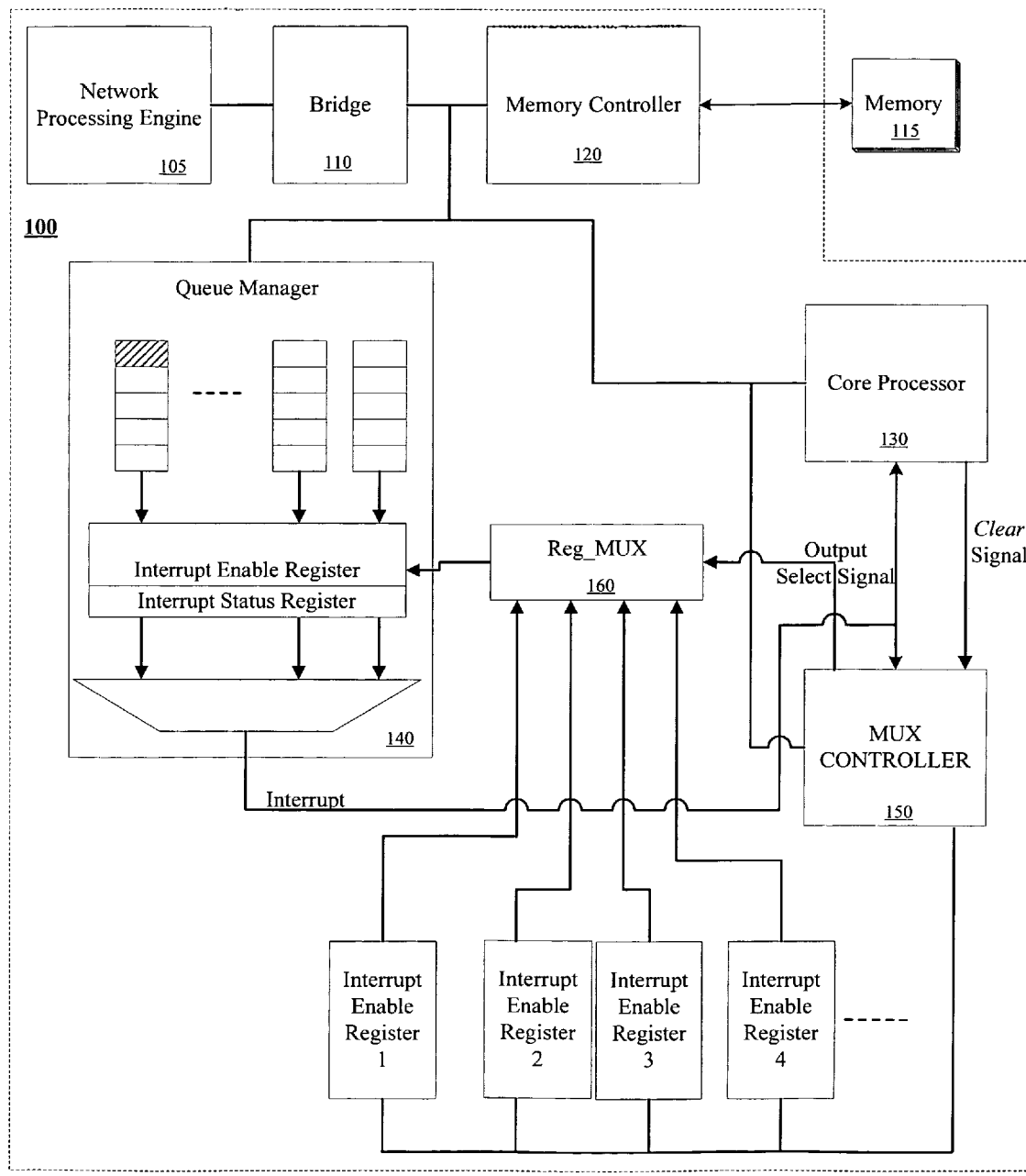
FIG. 1 is a block diagram of one embodiment of a network processor.

FIG. 1 is a block diagram of one embodiment of a network processor 100 coupled to a Memory 115. Memory 115 stores packet headers and data received at network processor 100. In one embodiment, memory 115 is a synchronous Dynamic Random Access Memory (SDRAM). However, in other embodiments, other types of DRAMs may be implemented.

Network processor 100 includes a network processing engine (NPE) 105, bridge 110, memory controller 120 and core processor 130. NPE 105 processes network packets received at network processor 100. In one embodiment, NPE 105 is a dedicated function processor including hardware accelerators (not shown). The accelerators are used to execute functions such as serialization/de-serialization, CRC checking/generation, DES/3DES, etc.

Bridge 110 enables NPE 105 to access various peripherals and internal targets (not shown) within network processor 100 for data transfers. Memory controller 120 is coupled to memory 115 and performs data transfers between network processor 100 and memory 115. Core processor 130 processes packets received at network processor 100. In one embodiment, core processor 130 is an XScale core processor available from Intel Corporation of Santa Clara, Calif. Alternatively, other processors may be used.

Network processor 100 includes a queue manager 140, controller (MUX_CONTROLLER) 150, an interrupt enable register multiplexer (Reg_MUX) 160 and a set of programmable interrupt enable registers which have their outputs multiplexed by Reg_MUX 160. In one embodiment, the total number of programmable interrupt enable registers is a power of two, and the width of each register equals the total number of queues within queue manager 140. MUX_CONTROLLER 150 varies an output-select signal to Reg_MUX 160.

According to one embodiment, data packets received at NPE 105 are stored in memory 115 while the address of the packet is written to one of the queues (set of FIFOs) within queue manager 140 based on relative priority. In a further embodiment, an interrupt will be asserted to core processor 130 requesting core processor 130 to process the packets pointed to by the address stored inside a queue that had its interrupt asserted whenever the queue becomes filled. In such an embodiment, the queue becomes filled upon reaching a programmable threshold.

After the interrupt is asserted, core processor 130 examines status registers in queue manager 140 to determine which queue caused the interrupt. Subsequently, core processor 130 processes the request accordingly. In one embodiment, a simple round robin interrupt service arbiter is used, enabling any queue to interrupt core processor 130 regardless of their relative priorities.

According to one embodiment, QoS processing of packets is by periodically swapping the value of interrupt enable registers within queue manager 140 over a period of time, so that at any given time frame, only queues that had their interrupts enabled are allowed to interrupt core processor 130. In this embodiment, interrupts from other queues are momentarily disabled regardless of whether their threshold is reached. This enables each queue a different number of packets it can service within a dedicated periodic time frame. In one embodiment, hardware support is implemented to make the process of varying the value of the interrupt enable registers transparent to system software.

As shown in FIG. 1, four interrupt enable registers and four interrupt pins are included in this embodiment. In one embodiment, a simple round robin arbiter is used to grant services to all interrupts to core processor 130. Each interrupt enable register is sequentially selected by Reg_MUX 160 at different points of time to be used for masking interrupts of queue manager 140 to core processor 130.

Figure 2:
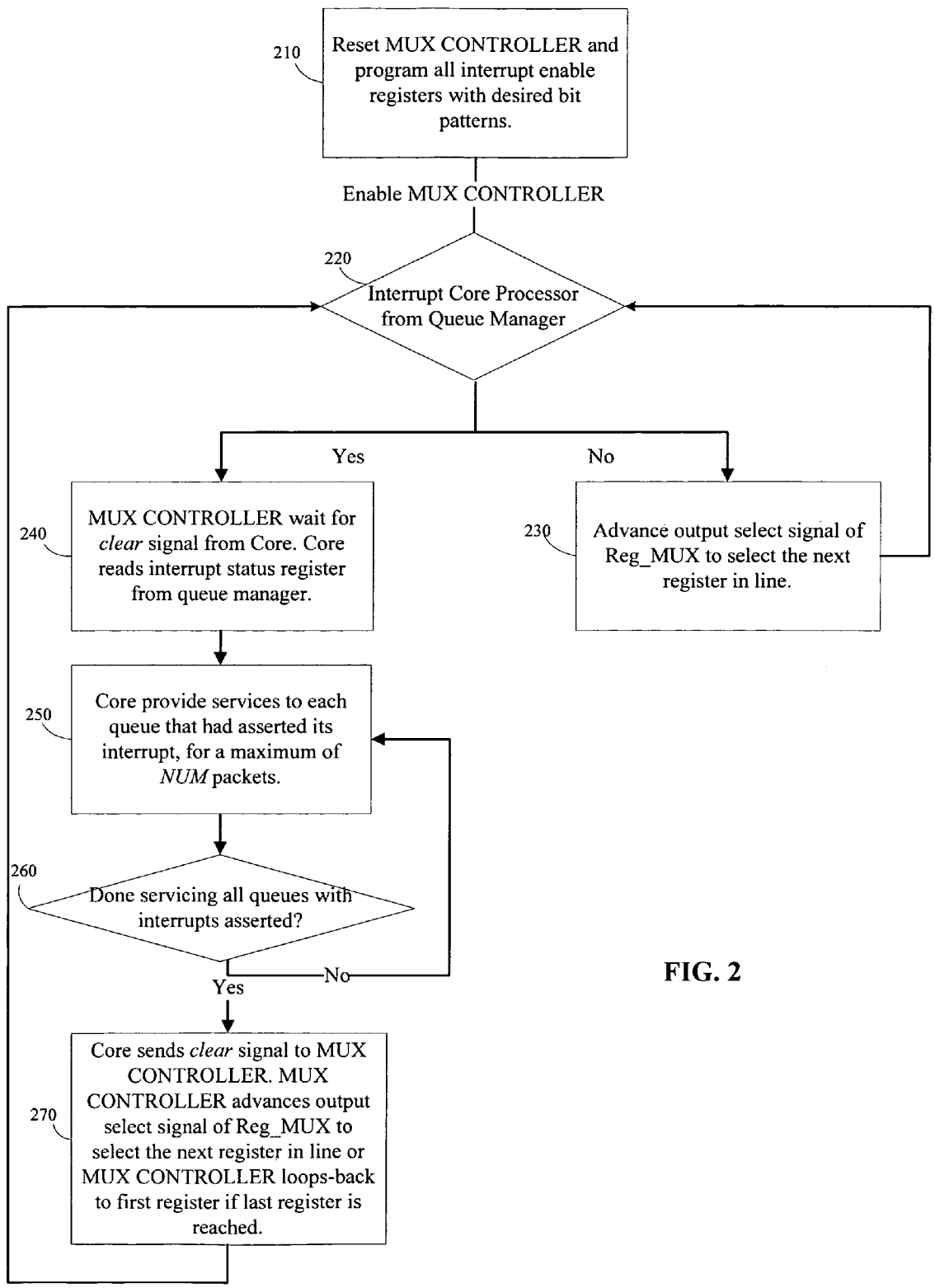
FIG. 2 is a flow diagram illustrating one embodiment of operation of a network processor.

FIG. 2 is a flow diagram illustrating one embodiment of the operation of network processor 100 for QoS processing of packets. At processing block 210, MUX_CONTROLLER 150 is reset and dedicated bit patterns are prewritten into all interrupt enable registers by a user.

At decision block 220, it is determined whether there are interrupts to core processor 130 from queue manager 140. This is performed by MUX-CONTROLLER 150 starting from the first register. If there are no pending interrupts, MUX_CONTROLLER 150 increments the output-select signal of Reg_MUX 160 to select the next register in line for disabling interrupts from dedicated queues within queue manager 140, processing block 230. Subsequently, control is returned to decision block 220 where it is determined whether there are interrupts to core processor 130 from the next register.

If it is determined that there are pending interrupts from the first register, MUX_CONTROLLER 150 will not advance the output-select signal of Reg_MUX 160. Core Processor 130 will read the interrupt status register of queue manager 140, and MUX_CONTROLLER 150 will wait for a clear signal from core processor 130, processing block 240. At processing block 250, core processor 130 provides service to each queue that had their interrupt asserted for a maximum of number of packets (NUM), where NUM is pre-set by the user.

At decision block 260, it is determined whether all of the queues have been serviced. If all queues have not been serviced, control is returned to processing block 250 for further servicing. If all queues have been serviced, core processor 130 asserts a clear signal to MUX-CONTROLLER 150 to increment the output-select signal to Reg_MUX 160 so that the next register in line is used to enable interrupts to queues inside queue manager 140, processing block 270.

Subsequently, control is returned to decision block 220 where it is determined whether there are interrupts to core processor 130 from the next register. In one embodiment, MUX-CONTROLLER 150 will loop back to the first interrupt enable register and proceed to decision block 220 once all registers have been cycled through.

Figure 3:
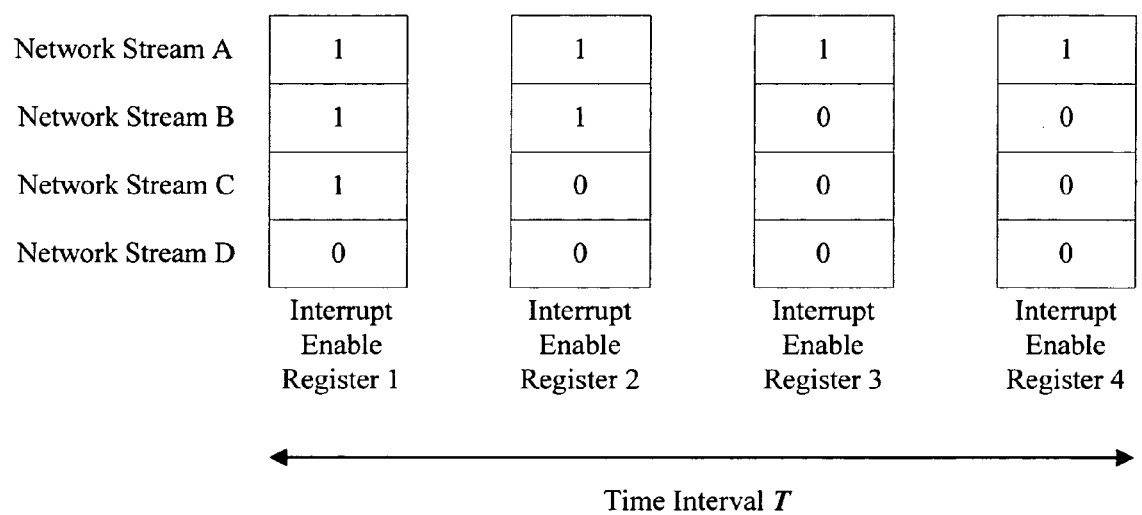
FIG. 3 illustrates one embodiment of a Quality of Service configuration.

FIG. 3 illustrates one embodiment of a QoS configuration. Notice that stream A has twice the bandwidth of stream B, and 4 times the bandwidth of stream C in time interval T, where stream D is disabled.

Figure 4:
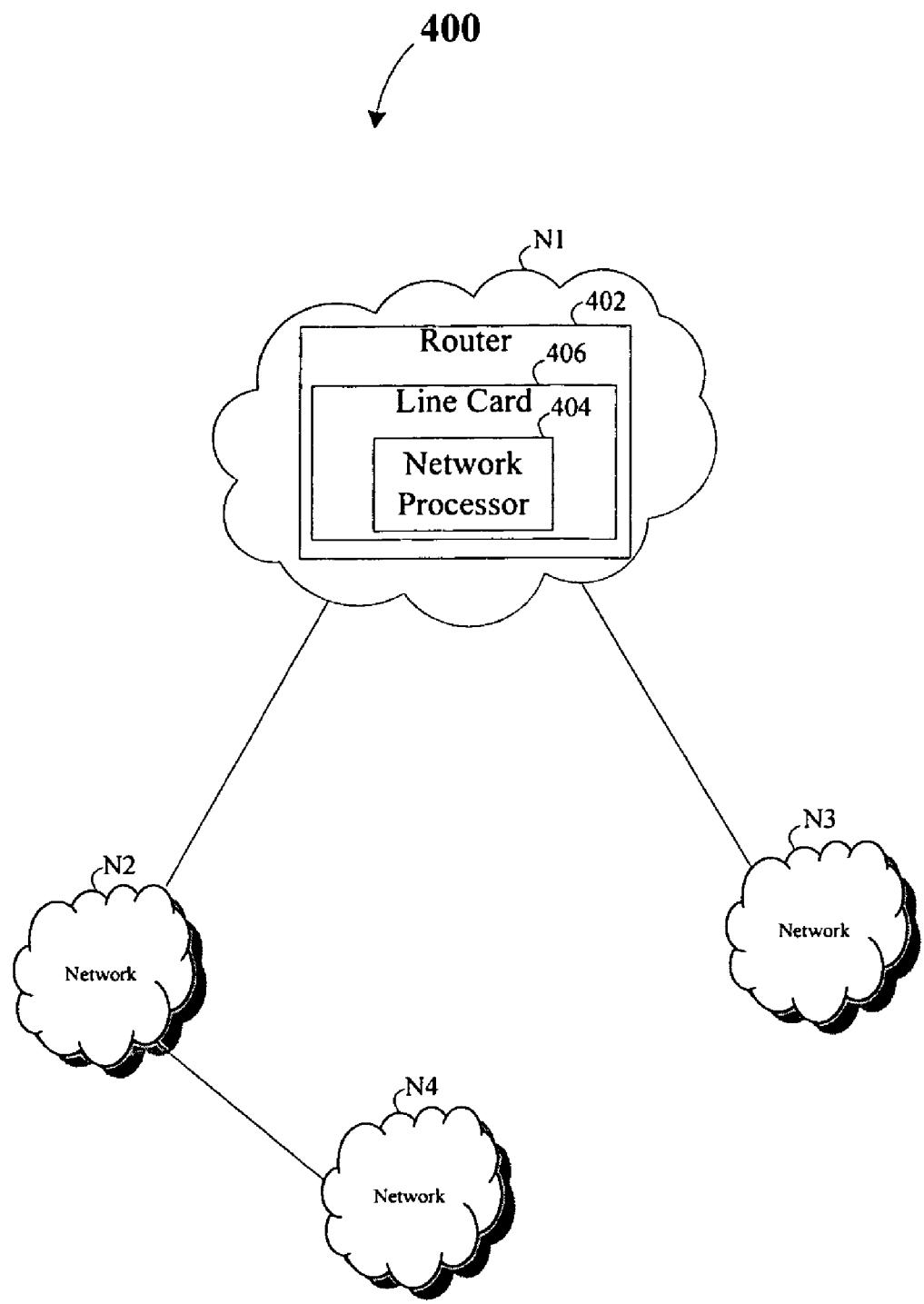
FIG. 4 illustrates one embodiment of a network.

FIG. 4 shows an exemplary system 400 including a first network N1 having a switching device 402 with a network processor 404 containing an authentication buffer as described above. The network processor 404 can form a part of a line card 406 within the switching device 402. The switching device 402 can be coupled to other networks N2, N3, N4 . . . , in a manner well known in the art.

It is understood that the switching device can be provided from a variety of devices that include data processing, such as a network router. Various network applications, configurations, switching devices, and topologies for the network and network processor will be readily apparent to one of ordinary skill in the art.

While the embodiments described herein are primarily shown and described in conjunction with an Intel IXP2850 network processor architecture, it is understood that the disclosed embodiments are applicable to network processors in general. For example, it will be appreciated that any number of network processors can be used without departing from the present embodiments.

The above-described mechanism performs internet packet traffic quality of service by implementing a set of interrupt controller registers, rather than a single register in conventional processors, to support the interrupt enable register within the queue manager through dedicated hardware and software support.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
   selecting a first of a plurality of programmable interrupt enable registers;
   a controller determining for the first register whether there are interrupts at a queue manager to be processed by a processor;
   the processor reading an interrupt status register within the queue manager; and
   the processor processing packets stored at a memory device that correspond to addresses stored in each of a plurality of queues within the queue manager.

2. The method of claim 1 further comprising:
   selecting a second of a plurality of programmable interrupt enable registers;
   the controller determining for the second register whether there are interrupts at the queue manager to be processed by the processor;
   the processor reading the interrupt status register after determining for the second register that there interrupts at the queue manager to be processed by the processor; and
   the processor processing packets corresponding to addresses stored in each of the plurality of queues.

3. The method of claim 1 further comprising:
   the processor transmitting a clear signal to the controller once the processor has processed packets for each of the plurality of queues; and
   the controller incrementing an output select signal to select the second register.

4. The method of claim 3 wherein the output select signal is received at a register multiplexer and the register multiplexer selects the second register.

5. The method of claim 1 further comprising writing bit patterns into each of the plurality of programmable interrupt enable registers prior to selecting the first register.

6. The method of claim 1 further comprising the controller incrementing an output select signal to select the second register if it is determined that there are no interrupts at the queue manager to be processed for the first register.

7. A network processor comprising:
   a plurality of programmable interrupt enable registers;
   a queue manager having:
      a plurality of queues to store addresses corresponding to data packets; and
      an interrupt status register;
   a controller to transmit an output select signal to select one of the plurality of registers; and
   a core processor to process packets stored at a memory device that correspond to addresses stored in each of a plurality of queues within the queue manager.

8. The processor of claim 7 wherein the controller selects a first of the plurality registers and determines for the first register whether there are interrupts at the queue manager to be processed by the processor.

9. The processor of claim 8 wherein the processor reads the interrupt status register within the queue manager.

10. The processor of claim 9 further comprising a register selector to receive the output select signal and select one of the plurality of registers.

11. The processor of claim 7 wherein the width of each of the plurality of registers equals the number of queues within the queue manager.

12. The processor of claim 7 further comprising:
    a network processing engine;
    a bridge; and a memory controller.

13. An article of manufacture including one or more computer readable media that embody a program of instructions, wherein the program of instructions, when executed by a processing unit, causes the processing unit to perform the process of:
    selecting a first of a plurality of programmable interrupt enable registers;
    determining for the first register whether there interrupts at a queue manager to be processed by a processor;
    reading an interrupt status register within the queue manager;
    processing packets stored at a memory device that correspond to addresses stored in each of a plurality of queues within the queue manager;
    selecting a second of a plurality of programmable interrupt enable registers; and
    determining for the second register whether there interrupts at the queue manager to be processed by the processor.

14. The article of manufacture of claim 13 wherein when executed by a processing unit, further causes the processing unit to perform the process of:
    reading the interrupt status register after determining for the second register that there interrupts at the queue manager to be processed by the processor; and
    processing packets corresponding to addresses stored in each of the plurality of queues.

15. The article of manufacture of claim 13 wherein when executed by a processing unit, further causes the processing unit to perform the process of:
    transmitting a clear signal to the controller once the packets for each of the plurality of queues are processed; and
    incrementing an output select signal to select the second register.

16. The article of manufacture of claim 15 wherein the output select signal is received at a register multiplexer and the register multiplexer selects the second register.

17. The article of manufacture of claim 13 wherein when executed by a processing unit, further causes the processing unit to perform the process of writing bit patterns into each of the plurality of programmable interrupt enable registers prior to selecting the first register.

18. A system comprising:
    a synchronous dynamic random access memory (SDRAM); and
    a network processor having:
       a plurality of programmable interrupt enable registers;
       a queue manager having:
          a plurality of queues to store addresses corresponding to data packets; and
          an interrupt status register;

a controller to transmit an output select signal to select one of the plurality of registers; and a core processor to process packets stored at the SDRAM that correspond to addresses stored in each of a plurality of queues within the queue manager.

19. The system of claim 18 wherein the controller selects a first of the plurality of registers and determines for the first register whether there are interrupts at the queue manager to be processed by the processor.

20. The system of claim 19 wherein the processor reads the interrupt status register within the queue manager.

21. The system of claim 19 wherein the network processor further comprises a register selector to receive the output select signal and select one of the plurality of registers.

22. The system of claim 19 wherein the controller selects a second of the plurality of registers and determines for the second register whether there are interrupts at the queue manager to be processed by the processor.

* * * * *